Patented May 29, 1945

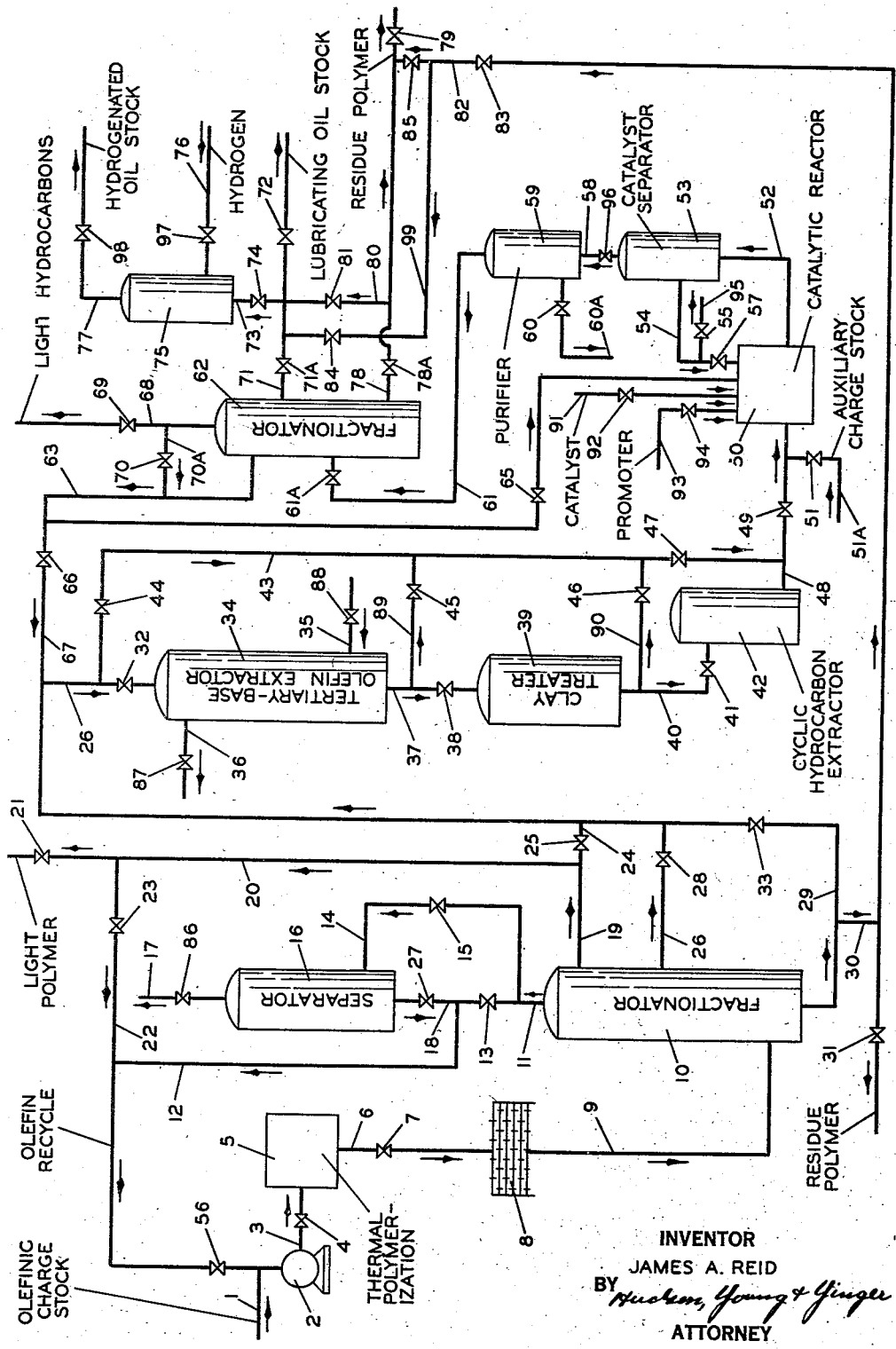

2,377,266

UNITED STATES PATENT OFFICE 2,377,266

PRODUCTION OF SYNTHETIC LUBRICATING OIL

James A. Reid, Bartlesville, Okla., assignor to Phillips Petroleum Company, a corporation of Delaware Application February 10, 1942, Serial No. 430,274

2 Claims. (Cl. 260—683.1)

This invention relates to synthetic lubricating oils, and more particularly to the manufacture of synthetic lubricating oils by a process comprising catalytic polymerization of a selected olefinic charge stock, said charge stock being produced by thermal polymerization of low molecular weight mono-olefins.

The catalytic polymerization of olefins to products in the viscosity range of lubricating oils is well known. The yields and properties of polymers in the lubricating oil range are dependent primarily on the catalysts, the charge stocks, and the operating conditions in the conversion system. Among the preferred catalysts that have been proposed for such polymerizations are the active metal halides such as aluminum chloride, zirconium tetrachloride, boron fluoride, and the like. These catalysts may be used alone, in combination with one another, or in conjunction with modifiers such as are known in the art. These catalysts and modified catalysts are usually not equivalents, but are selected, together with the other operating conditions of the conversion system, to best utilize the charge stocks being treated.

The conversions are normally operated in liquid phases at temperatures in the range of 30 to 100° C. The contact times are relatively long, ranging from one or a few minutes for the conversion of isoolefins, particularly isobutylene, to several hours for the conversion of olefins produced by the dehydrogenation or cracking of waxes. The reaction rates in general increase with increase in temperature. The average molecular weight of the product is decreased by an increase in polymerization temperature. Secondary reactions, such as isomerization, cyclization, hydrogenation-dehydrogenation, and the like, which are normally undesirable, are favored by elevated temperatures. It is thus desirable to use as moderate reaction conditions as will produce the desired products in a reasonable reaction time from the selected charge stocks.

The nature of charge stocks themselves has a profound influence on the yield and character of the polymer in the lubricating oil range. The lowest molecular weight monoolefin, ethylene, is not readily converted into lubricating oil range products in these systems discussed. The reaction rates are very low, the yield of polymers in the lubricating oil range is not satisfactory, and the oil is quite inferior in physical characteristics. For example, the polymers produced from ethylene in conventional metal halide catalytic systems have viscosity indexes of zero or less.

The olefins having molecular weights higher than that of ethylene react at much more rapid rates, so that lower reaction temperatures may be used, and yield of oil may be increased markedly. Propylene is polymerized at a moderate rate in these systems to yield a product containing up to 20 or perhaps 30 per cent of polymer in the lubricating oil viscosity range. The viscosity index of the oil range polymer, made under suitable conditions, is about 15 to 35. With increase in molecular weight in the series of normal olefins containing terminal unsaturation (1-olefins), the viscosity index of the polymer increases progressively; the polymers from hexene-1 have viscosity index values of about 100, for example.

As the molecular weight of the charge increases, its molecular structure becomes increasingly important, particularly influencing the viscosity, viscosity index, and thermal stability of the resultant polymer. The polymers of normal olefins are more resistant to thermal decomposition than the polymers resulting from polymerization of tertiary-base olefins. In a series of polymers prepared from isomeric olefins of identical molecular weight containing 5 or more carbon atoms per molecule, the polymers prepared from olefins having the greatest number of branched members or side chains in the molecule, and from olefins in which the unsaturation is furthest from the terminal position, have the lowest viscosity indexes.

From these considerations the desired characteristics of an olefinic charge stock for conversion into lubricating oil viscosity range polymers have been developed.

It is an object of this invention to produce olefinic hydrocarbons for conversion by catalytic polymerization into lubricating oil range polymers of high viscosity index. It is a further object of this invention to utilize low molecular weight olefins for the preparation of a charge stock suitable for catalytic conversion into lubricating oil range polymers. It is a further object of this invention to convert low molecular weight olefins in high yields into lubricating oil range polymers of high viscosity index and thermal stability. Other objects of this invention will be evident to one skilled in the art from the accompanying disclosure and discussion.

These objectives are attained in the present invention by means of a process comprising the thermal polymerization of low molecular weight aliphatic mono-olefins, particularly ethylene, under specific and controlled conditions hereinafter disclosed, fractionating and/or otherwise segregating the most desirable portions of the thermal polymers so produced and subjecting such selected polymers to catalytic polymerization in a metal halide system to form polymers in the lubricating oil viscosity range.

Low molecular weight mono-olefins, such as ethylene and propylene, can be polymerized in the absence of catalysts under the influence of elevated temperatures and pressures. At temperatures above 480° C. and pressures from atmospheric to moderately high values, these olefins are converted substantially into reaction products in the gasoline boiling range. In these conversions, there occur in addition to simple polymerization many other reactions, such as isomerization of the polymers to more highly branched structure, formation of cyclic olefins and paraffins, hydrogenation-dehydrogenation reactions with the formation of aromatics, diolefins, and the like. The products of such conversions are very unsuitable for subsequent conversion in a catalytic system to lubricating oil range polymers, because the resultant products have low viscosities, very low viscosity indexes and rapid catalyst deactivation occurs.

As the reaction temperature is decreased in the systems for thermal conversion of simple olefins, the reaction rate gradually decreases, but simultaneously the extent of the secondary reactions, or reactions other than simple polymerization, decreases with increase in proportion of simple polymer in the product. In addition, a gradual increase in the average molecular weight of the polymer becomes evident, particularly at temperatures below 425° C.

With decrease in temperature and corresponding reduction in reaction rate, it becomes desirable to increase the pressure so as to increase the conversion rate. In addition, increase in pressure, particularly in the range of 2000 to 6000 pounds per square inch, produces an increase in molecular weight of the polymer.

The most desirable temperature for the thermal conversion of olefins, particularly ethylene, to simple polymers with a minimum of isomerization, cyclization, etc., is in the range of 315 to 400° C., and preferably below 370° C. At temperatures below 345° C., even at relatively high pressures, the reaction rate decreases to such an extent that the yield of polymer becomes unsatisfactory. At temperatures above 370° C., the extent of isomerization, cyclization, etc., increases and the proportion of higher boiling polymer decreases to such an extent that both the yield and the quality of the product of the catalytic conversion of such olefins decrease rapidly.

In the preferred temperature range, the operating pressures found most satisfactory are in the range of 2000 to 10,000 pounds per square inch, with pressures of 3500 to 6000 pounds per square inch being preferred. Both the reaction rate and the proportion of higher boiling polymers are increased through increase in reaction pressure; since the higher boiling polymers are preferred as charge for the catalytic conversion, the higher reaction pressures greatly increase the quantity of preferred polymer produced in the thermal process.

The reaction times used in the thermal conversion are dependent upon the operation temperatures and pressures; normal reaction times are in the range of about 2 to about 50 minutes. In the reaction conducted at the lower temperatures and higher pressures, the reaction time affects the extent of conversion without markedly altering the characteristics of the polymer. Normally the contact time is so controlled as to effect a conversion of about 30 to about 60 per cent of the olefinic charge to polymers. An increase in reaction time generally increases the extent of conversion at a given polymerization temperature.

In the thermal polymerizations utilizing pure olefinic charge, it has been found that sufficient heat may be liberated in localized areas in the reaction zone to increase the temperature considerably above the desired value, particularly in polymerizations in the higher pressure ranges. The exact concentrations at which these conditions are encountered depend upon a variety of factors, such as the identity of the olefin, the size and shape of the reaction vessel, and the like. It is desirable to utilize as high a concentration of olefin as possible so as to produce the greatest amount of polymer under the particular operating conditions. However, when control of reaction temperature becomes unsatisfactory, the reaction can be adequately controlled through the addition of paraffinic hydrocarbons as diluent in the charge. The diluent may be selected so as to facilitate separation from the recycle olefin and from the product.

The proportion of polymers resulting from thermal conversion of simple olefins such as ethylene which is useful for production of preferred oils in subsequent catalytic conversion systems is also influenced by the thermal polymerization conditions. The preferred charge stocks contain the higher molecular weight olefins, for example only that portion distilling above 150° C., and also contain a minimum of cyclics, isomerization products, and the like. Both of these characteristics are favored by operation at higher pressures and lower temperatures. The thermal polymers which are produced in the preferred operating range contain a minor proportion of polymers in the gasoline boiling range, a major proportion in the distillation range of 200 to 350° C., and a minor proportion of polymers in the lubricating oil range.

In the catalytic conversion of the thermal polymer, it is usually desirable to polymerize only the higher boiling fractions from the thermal polymerizations, with rejection or possibly recycle of the lower boiling polymers. For example, that fraction of a thermal polymer distilling above 200° C. was converted to a product containing 75 per cent of lubricating oil viscosity range product having a viscosity index of 105, whereas the catalytic conversion of the butene-free portion of the same thermal polymer distilling below 200° C. contained 60 per cent of lubricating oil range polymer having a viscosity index of 68. The thermal polymer in the lubricating oil range may be separated from the lower-boiling polymer without other treatment; it may also be treated together with the other higher boiling fractions, in the catalytic process, since little increase in molecular weight is found to occur, but an appreciable decrease in the freezing point of the polymer may occur, particularly in those catalytic systems using metal halide catalysts in conjunction with hydrogen halides.

In the catalytic conversions, it is usually desirable to use as charge stock an olefinic hydrocarbon mixture from which tertiary-base olefins, cyclics, and the like, have been removed. Some of these types of compounds in the olefinic charge stocks have a marked effect on the viscosity and viscosity index of the catalytic polymer, even when present in very minor proportions.

The removal of these materials from the charge to the catalytic system may also increase the thermal stability and improve the oxidation characteristics of the catalytic polymer. The higher the proportions of these undesired molecular species in the thermal polymer, the greater the improvements that can result from their removal. The tertiary-base and other reactive olefins may be extracted from the hydrocarbon mixture through intimate agitation with 70 per cent sulfuric acid at temperatures of about 35° C., or by selective polymerization using a catalyst capable of converting the more reactive olefins, with subsequent separation of the polymer by distillation. The cyclic hydrocarbons may similarly be separated by means known in the art, such as fractionation, azeotropic distillation, selective solvent extraction, fractional crystallization of the non-cyclized polymers, and the like.

In the practice of this invention, it may thus be desirable to operate the thermal polymerization system at a temperature considerably below that at which the maximum conversion rate is secured, since the proportion of polymer in the desired distillation range and having the desired structural characteristics may thereby be increased, and the loss of charge stock through conversion to undesired polymeric materials may be decreased. The proportion of thermal polymer which is unsuitable for use as charge in the catalytic polymerization system may thus be reduced to a very low value, such as 20 or even 15 per cent.

In the catalytic conversion system, it is found that such a preferred charge, which may already contain a portion of polymers in the lubricating oil range, may be converted to 70 or even 80 per cent of polymers in the lubricating oil viscosity range. Lubricating oil fractions are separated from the polymer produced by catalysis and may be used directly as a lubricant although it is usually preferred to subject them to a non-destructive hydrogenation, in order to increase their stability. The hydrogenated products are colorless, substantially saturated, aliphatic hydrocarbon oils. These oils are superior lubricants for internal combustion engines either when used alone or when blended with natural lubricating oils. Their life as a crankcase lubricant is considerably increased and their effective performance is considerably improved by adding one or more of the various oxidation inhibitors, wear-controlling materials, dispersing agents, solvents, and the like, such as are known in the art.

Lubricants may also be prepared from these polymers through combination of the polymeric olefin with an aromatic, cyclic or other reactive hydrocarbon. The olefinic polymer from the thermal or the catalytic conversion step may also be used as a raw material for utilization in a variety of products of chemical manufacture.

The following discussion of the accompanying diagram will aid in understanding my invention. An olefinic charge stock is introduced from a source not shown through line 1. This charge comprises essentially low molecular weight olefins such as ethylene and propylene; other inert diluent gases may, however, be present. Upon passing through pump 2 these gases are compressed to a pressure in the range of from 2000 to 10,000 pounds per square inch, preferably from 3500 to 6000 pounds per square inch. The compressed charge is then passed through line 3 controlled by valve 4 to thermal polymerization reactor 5. In this reactor the compressed gases are heated to a temperature in the range of about 315 to 400° C., preferably at a temperature below 370° C. The polymerization reaction is exothermic, and portions of the reactants may attain temperatures considerably higher than the average temperature of the system unless the reactor is designed and controlled to maintain uniform temperatures throughout. The reaction time of the reacting gases in the thermal reactor is not critical in my invention. Increasing the reaction time increases slightly the average molecular weight of the polymer product, but this effect of reaction time on molecular weight is much less than the effect of temperature and pressure. The reaction time will, therefore, be determined largely by economic considerations; I prefer to operate so that about 30 to 65 per cent of the reactant olefins are converted per pass.

The effluent from reactor 5 then passes through line 6 controlled by valve 7 through cooler 8. The cooled product then passes through line 9 to fractionator 10. In this unit the product is separated into a series of fractions on a basis of boiling ranges. Unreacted olefins such as ethylene and propylene and other normally gaseous materials are removed through line 11 and may be recycled directly to line 1 by line 12 controlled by valves 13 and 56, but it is usually desirable to pass such gases by means of line 14 controlled by valve 15 to auxiliary separator 16. In this separator at least a portion of the methane and lighter materials are removed from the system by line 17 controlled by valve 86. The remainder containing essentially unreacted olefinic charge is introduced into recycle line 12 by line 18 controlled by valve 27 and returned to the thermal polymerization zone.

The lower molecular weight polymers such as those containing 4 to 8 carbon atoms per molecule are removed from fractionator 10 by line 19. This material may be rejected from the system by line 20 controlled by valve 21, and used in any desired manner. For example, this fraction can be converted to a high anti-knock gasoline blending stock by a suitable combination of reactions, such as isomerization, alkylation and polymerization. In some cases, it may be desirable to recycle at least a portion of this low molecular weight polymer to the thermal reactor. This may be done by means of line 22 controlled by valve 23. In other cases this fraction may be used in the subsequent catalytic polymerization step, and for this purpose is passed through line 24 controlled by valve 25 and thence through line 26 to be treated as subsequently discussed herein.

The portion of the thermal polymer comprising material having between about 10 to about 20 carbon atoms per molecule is removed from fractionator 10 by means of line 26 controlled by valve 28. This is generally the preferred fraction for use in the subsequent polymerization step and for this purpose is ultimately passed to catalytic reactor 50 the operation of which is discussed herein.

Higher molecular weight material is removed from fractionator 10 as residue by means of line 29. This product may be removed from the system through line 30 and valve 31, and used for any desired purpose. For example, it may be used as a charge stock for a cracking process to produce high octane number gasoline. In some cases it may be desirable to include this high molecular weight material in the charge to the subsequent purification and catalytic polymerization step. In such a case it is passed to line 26 through line 29 and valve 33. In other instances it may be advantageous to pass such high molecular weight material from fractionator 10 through conduits 29, 30, 82, 99, 71 and 73 controlled by valves 83, 84, and 74 to hydrogenator 75 as will be discussed herein.

The thermal polymer may contain appreciable amounts of tertiary base olefins. In the catalytic polymerization, these olefins produce polymer oils having low viscosity indexes and poor thermal stability. It is, therefore, desirable to remove such compounds from the charge stock for the catalytic polymerization. Thermal polymer fractions coming from any combination of lines 24, 26 and 29 pass through line 26 and are fed to reactor 34 through valve 32. In reactor 34 tertiary-base olefins are removed from the charge thereto by any suitable means. One means of removing such tertiary-base olefins is by selective polymerization. Sulfuric acid of about 75 per cent concentration is introduced to reactor 34 by means of line 35 controlled by valve 88. By contacting hydrocarbons and said acid under suitably controlled conditions, such as at a temperature of about 35° C., as previously mentioned, for a time sufficient to effect essentially complete removal of tertiary-base olefins, as can be readily determined by one skilled in the art for the particular hydrocarbon mixture being treated, tertiary-base olefins are selectively reacted to produce polymers and to some extent are dissolved by the acid, and acid and polymers are removed by means of line 36 controlled by valve 87. Tertiary-base olefin free product is then sent to clay treater 39 by means of line 37, controlled by valve 38. In clay treater 39 traces of acidic material and other undesirable compounds are removed by contacting the charge thereto with an absorbent clay. After this treatment the product therefrom may still contain an appreciable proportion of aromatics or cyclic hydrocarbons. In order to remove these, effluent from treater 39 is sent to extractor 42 by means of line 40 and valve 41. Aromatics and/or cyclic hydrocarbons are removed at this stage by means of selective adsorption or absorption methods, azeotropic distillation, or any other suitable treatment. Suitable selective solvents include liquid sulfur dioxide, aniline, aromatic sulfonic acids, furfuraldehyde, levulinic acid, etc. These and others, and their conditions of use, are well known to those skilled in the art, for example, see Ellis, "The Chemistry of Petroleum Derivatives," The Chemical Catalog Co., Inc., 1934, particularly pages 33–35 and 1145–1146. Effluent from aromatic and cyclic hydrocarbon extractor 42 is passed through line 48 controlled by valve 49 to catalytic reactor 50.

When any of the above discussed purification steps are not necessary in my process thermal polymer from fractionator 10 may by-pass any one or combination of these steps. Some of the means for accomplishing this are shown in the drawing. For example, products from the thermal polymerization unit may be passed directly to catalytic reactor 50, after suitable fractionation in unit 10, from line 26 through line 43 and valves 44 and 47 when valve 32 is closed. When it is desirable to by-pass treaters 39 and 42 but not the tertiary-base olefin extractor 34, effluent from said extractor 34 is passed through lines 37 and 89 and valve 45 to line 43 and thence to catalytic reactor 50 when valve 38 is closed. Similarly, when it is desirable to treat products of the thermal polymerization step in both units 34 and 39, effluent from unit 39 is passed through lines 40 and 90 and valve 46 to line 43 when valve 41 is closed.

In some cases it may be desirable to introduce to line 48 an auxiliary stock by means of line 51A controlled by valve 51. For example, if the thermal polymer material consists primarily of hydrocarbons containing between about 15 and 20 carbon atoms per molecule, it may be desirable to add an aromatic hydrocarbon or cyclo-olefin through line 51A which will react with any aliphatic olefins in catalytic reactor 50. Catalyst may be introduced to reactor 50 by means of line 91 controlled by valve 92.

The preferred catalytic materials are the active metal halides, such as aluminum chloride, boron fluoride, zirconium tetrachloride and the like, used either alone or in combination with one another, and preferably in conjunction with one or more of the promoters or modifiers such as are known in the art. Suitable well known promoters are hydrogen halides and alkyl halides; well known modifiers include halides of alkali and alkaline earth metals, such as sodium chloride, and organic polar compounds such as nitrobenzene, acetophenone, etc. Promoter or modifier is added to reactor 50 through line 93 controlled by valve 94. Since the catalytic polymerization reaction is strongly exothermic, reactor 50 is preferably equipped with suitable stirring means and with adequate temperature control equipment. The catalytic polymerization is carried out in the liquid phase at a temperature in the range of from about 0 to 80° C. The time of reaction will vary considerably with the nature of the charge stock and the catalyst and modifiers used, but will usually be in the range of from about ½ to 4 hours. The total product and catalyst is then removed from reactor 50 by means of line 52 and introduced to catalyst separator 53. In this apparatus catalytic material is separated from hydrocarbons and is removed by means of line 54 and may be ejected through valve 55 and line 95. Usually, however, catalyst separated in apparatus 53 still possesses considerable catalytic activity and all or a portion of it is then recycled to the reactor 50 through line 54 controlled by valve 57. Hydrocarbons are then led to purifier 59 by means of line 58 controlled by valve 96, wherein traces of catalyst, acidic materials and other undesirable compounds are removed from the system by means of line 60A controlled by valve 60. Such removal may be effected by means well known to those skilled in the art, such as by contacting with a solid adsorbent such as silica gel, charcoal, bauxite, etc., washing with water and/or with an alkaline solution such as aqueous sodium hydroxide or aqueous sodium carbonate, preferably followed by filtration of the hydrocarbon material through adsorbent clay, or the like.

Purified hydrocarbons are then sent to fractionator 62 by means of line 61 controlled by valve 61A. Unreacted charge to reactor 50 and low molecular weight polymers produced therein are removed by line 63 from fractionator 62. In some cases such material may be recycled directly to the catalytic reactor 50 through valve 65 but in most cases an additional purification treatment is desirable and then such material is recycled to line 26 by means of line 67 controlled by valve 66. Diluent and light hydrocarbons may be removed from fractionator 62 by means of line 68 and rejected through valve 69. In some cases, however, a portion or all of this light hydrocarbon fraction in line 68 may be passed to line 63 by means of line 70A controlled by valve 70. A distillate fraction in the viscosity range of lubricating oils is removed from fractionator 62 by line 71 controlled by valve 71A. This may be removed from the system through valve 72 to be blended or compounded and used in any desired manner. However, this fraction is usually transferred by means of line 73 controlled by valve 74 to hydrogenating unit 75. Hydrogen gas is introduced into this unit by means of line 76 controlled by valve 97, wherein polymer is subjected to a catalytic nondestructive hydrogenation. This hydrogenation step increases the resistance of the resultant oil to oxidation and degradation reactions. Hydrogenated oil is removed from the hydrogenation unit by means of line 77 controlled by valve 98.

Residual polymer is taken from fractionator 62 by means of line 78 controlled by valve 78A. It may be removed from the system through valve 79 to be used in any desired manner. For example, this residue may be subjected to a separate hydrogenating process and then used as a high viscosity oil blending stock. In some cases it may be combined with the fraction of distillate oil by means of line 80 controlled by valve 81. Under carefully controlled conditions residue leaving fractionator 10 by means of line 29 may be satisfactory lubricating oil stock. In such cases this residue can be passed through line 82 controlled by valve 83 and then combined with residue and/or distillate oil from fractionator 62 by manipulation of valves 84 and 85 in lines 99 and 82, respectively. Hydrogenation of this residue polymer also increases its chemical stability.

The diagram of my invention is purely schematic and much auxiliary equipment will be necessary in order to place such a system into actual operation. Such equipment, however, will not affect the basic operations involved. Various modifications of my invention will also be apparent, which can be made without departing from the spirit and novelty thereof. For example, it may be desirable to separate polymer in fractionator 10 into additional narrower boiling range fractions, treating and catalytically polymerizing them separately in order to produce selected lubricants for specific uses. It may also be desirable to add other purification units in parallel with those shown in the diagram, in order that one may be reconditioned while the other is used on stream. In some cases it may not be desirable to separate a distillate lubricating oil fraction in fractionator 62, but to remove all oil material as a residue, and then subject it to additional fractionation and hydrogenation steps. Other possible variations in the embodiment of my invention will be apparent to one skilled in the art.

The following examples are cited to illustrate important features of my invention.

Example I

Ethylene was polymerized in a non-catalytic system at various temperatures and pressures in a series of experiments. The ethylene was pumped through a coil of steel tubing having an inside diameter of ⅛ inch, held at constant temperature in a bath of molten lead alloy. It had been found that in using a cylindrical bomb type of reactor, erratic results were obtained due to inadequate control of temperature in the reaction zone. By using a coil of steel tubing as described, uniform results were obtained. It was found that the average molecular weight of the product increased slightly upon increasing the contact time, and therefore the extent of conversion, but the change was slight for conversions in the range of from about 30 to 65 per cent converted per pass. This effect of the contact time was much smaller than the effect of changes of temperature and pressure upon the average molecular weight of the polymer. The time of contact is therefore, relatively unimportant in the control of molecular weight.

In columns 3 and 4 of the following table are given the percentages of polymer boiling above 150° C. and 300° C. for the products obtained by thermal polymerization of ethylene under the conditions of temperature and pressure given in columns 1 and 2.

| 1 | 2 | 3 | 4 | 5 6 Viscosity index of catalytic polymer | |
|---|---|---|---|---|---|
| Temp., °C. | Pressure, lbs./sq. in. | Per cent boiling above 150° C. | Per cent boiling above 300° C. | From raw thermal polymer | From treated thermal polymer |
| 345 | 3,500 | 91 | 61 | 96 | 100 |
|  | 5,000 | 94 | 71 | 102 | 105 |
| 370 | 2,000 | 78 | 29 | 83 | 89 |
|  | 3,500 | 85 | 47 | 88 | 93 |
|  | 5,000 | 89 | 57 | 94 | 99 |
| 425 | 2,000 | 62 | 8 | 58 | 75 |
|  | 3,500 | 66 | 14 | 65 | 80 |
|  | 5,000 | 68 | 22 | 69 | 86 |

These data show that the average molecular weight of the polymer, as indicated by boiling range, increases with increasing pressure and decreasing temperature. It has been previously pointed out in this disclosure that the thermal polymer boiling below about 150° C. is much less desirable as charge stock for the subsequent catalytic polymerization, than the polymer boiling above 150° C., and that in the preferred operation of this invention this low boiling thermal polymer will be separated and utilized in some other manner. These data show that in order to operate with a high yield of polymer boiling above 150° C., for example, 85 per cent or more, the temperature of operation should be below a maximum of 370° C., and the pressure about 3500 pounds per square inch or higher.

Example II

A portion of the thermal polymer boiling above 150° C. produced in each of the runs in the series cited in Example I was individually polymerized using aluminum chloride catalyst plus hydrogen chloride promoter in the liquid phase at temperatures of about 30 to 45° C. The polymer product was treated to remove catalytic materials, and fractionated. The viscosity index of the lubricating oil fraction from each sample is given in column five of the table in Example I.

These data show that increasing the temperature of production of the thermal polymer decreases the viscosity index of the resulting oily catalytic polymer.

The data also show that increasing the pressure of the thermal conversion increases the viscosity index of the catalytically produced oily polymer oil. Therefore, to produce catalytic polymer oils of high viscosity index, the thermal polymer charge should be produced under as high pressure and as low temperature as are economically operative.

Example III

A portion of the thermal polymers boiling above 150° C. produced in each of the runs cited in Example I was agitated with 80 per cent sulfuric acid, and the resultant hydrocarbon phase then treated with activated adsorbent clay. This purified product was catalytically polymerized by the same procedure as cited in Example II. The viscosity index of the lubricating oil fraction from each run is given in column six of the table.

These data show that the viscosity index of the oily catalytic polymer is increased by purifying the thermal polymer to remove small amounts of aromatics, tertiary-base olefins, diolefins, and other products present as a result of secondary thermal reactions.

The data also show that the greatest improvement in viscosity index is obtained from the thermal polymer produced at the highest temperature. This indicates that the side or secondary reactions become proportionately more pronounced as the temperature of thermal polymerization increases.

The above examples are given to illustrate specific features of my invention, and it is not intended that they shall unduly limit my invention.

I claim:

1. In a process for producing an improved synthetic lubricating oil the improvement which comprises, passing a normally gaseous hydrocarbon mixture containing ethylene and propylene to a noncatalytic polymerization zone, subjecting said mixture in said zone to a temperature between 315 and 400° C. and to a pressure between 3500 and 6000 pounds per square inch for a period of time sufficient to polymerize between 30 and 60 per cent of the normally gaseous olefin hydrocarbons charged to said zone, passing effluent from said polymerization zone to a fractionating means, removing therefrom a polymer fraction having a boiling range between 150 and 350° C., treating said polymer fraction to remove therefrom tertiary-base olefins and cyclic hydrocarbons, passing the resultant treated polymer fraction to a catalytic polymerization zone, and subjecting said fraction to the action of a polymerization catalyst under conditions to produce an optimum amount of hydrocarbon polymers in the viscosity range of lubricating oil.

2. An improved process for producing a synthetic lubricating oil having a viscosity index of at least about 100, which comprises subjecting ethylene to polymerization in the absence of a catalyst at a temperature between 315 and 370° C. under a pressure in excess of 3,500 pounds per square inch for a period of time sufficient to polymerize between 30 and 60 per cent of said ethylene, passing effluents of said polymerization to a fractionating means, removing therefrom a polymer fraction having a boiling range between 200 and 350° C., treating said polymer fraction to remove therefrom tertiary-base olefins and cyclic hydrocarbons, subjecting the resultant treated polymer fraction to catalytic polymerization in the presence of a metal halide catalyst under conditions such as to produce an optimum amount of hydrocarbon polymers in the viscosity range of lubricating oil, passing effluents of said catalytic polymerization to fractionating means and separating therefrom a hydrocarbon fraction in the viscosity range of a lubricating oil and having a viscosity index of at least about 100.

JAMES A. REID.